United States Patent
Turkan et al.

(10) Patent No.: US 9,652,830 B2
(45) Date of Patent: May 16, 2017

(54) METHOD AND APPARATUS FOR PERFORMING HIERARCHICAL SUPER-RESOLUTION OF AN INPUT IMAGE

(71) Applicant: THOMSON LICENSING, Issy de Moulineaux (FR)

(72) Inventors: Mehmet Turkan, Rennes (FR); Dominique Thoreau, Cesson Sevigne (FR); Philippe Guillotel, Vern dur Seiche (FR)

(73) Assignee: THOMSON LICENSING DTV, Issy-les-Moulineaux (FR)

( * ) Notice: Subject to any disclaimer, the term of this patent is extended or adjusted under 35 U.S.C. 154(b) by 0 days.

(21) Appl. No.: 14/382,569

(22) PCT Filed: Mar. 4, 2013

(86) PCT No.: PCT/EP2013/054272
§ 371 (c)(1),
(2) Date: Sep. 3, 2014

(87) PCT Pub. No.: WO2013/131851
PCT Pub. Date: Sep. 12, 2013

(65) Prior Publication Data
US 2015/0093045 A1 Apr. 2, 2015

(30) Foreign Application Priority Data

Mar. 5, 2012 (EP) ..................................... 12305264

(51) Int. Cl.
G06T 3/40 (2006.01)
G06T 5/50 (2006.01)

(52) U.S. Cl.
CPC .......... G06T 3/4076 (2013.01); G06T 3/4053 (2013.01); G06T 3/4084 (2013.01);
(Continued)

(58) Field of Classification Search
CPC ... G06T 3/4007; G06T 3/4053; G06T 3/4023; G06T 3/40; G06T 9/007; H04N 1/40068;
(Continued)

(56) References Cited

U.S. PATENT DOCUMENTS

2012/0086850 A1 4/2012 Irani et al.

FOREIGN PATENT DOCUMENTS

| CN | 101540045 | 9/2009 |
|---|---|---|
| CN | 101980284 | 2/2011 |
| WO | WO2010122502 | 10/2010 |

OTHER PUBLICATIONS

Ashikhmin: "Synthesizing natural textures"; ACM Symp. Interactive 3D Graph. 2001; pp. 1-10.
(Continued)

Primary Examiner — Duy M Dang
(74) Attorney, Agent, or Firm — Tutunjian & Bitetto, P.C.

(57) ABSTRACT

Super-resolution refers to a process of recovering the missing high-frequency details of a given low-resolution image. Known single image SR algorithms are often computationally intractable or unusable for most of the practical applications. The invention relates to a method for performing hierarchical super-resolution based on self content neighboring patches information is based on pyramidal decomposition. The intrinsic geometric property of an input LR patch neighborhood is obtained from the input LR patch and its K nearest neighbors taken from different down-scaled versions of the LR image.

12 Claims, 4 Drawing Sheets

(52) U.S. Cl.
CPC ...... *G06T 5/50* (2013.01); *G06T 2207/20052* (2013.01); *G06T 2207/20216* (2013.01)

(58) Field of Classification Search
CPC ........ H04N 7/50; H04N 7/30; H04N 7/26244; H04N 7/26313; H04N 7/26079; H04N 7/26563; H04N 7/26579; H04N 7/26393; H04N 7/2651
See application file for complete search history.

(56) References Cited

OTHER PUBLICATIONS

Chang et al "Super-resolution through neighbor embedding", IEEE Proceedings of the 2004 IEEE Computer Society COnference on Computer Vision and Pattern Recognition, vol. 1, Jun. 27, 2004, pp. 275-282.
Criminisi et al: "Region Filling and object removal by examplar-based image inpainting", IEEE Trans. Image Processing vol. 13, 2004; pp. 1-13.
Efros et al: "Texture synthesis by non-parametric sampling", IEEE International Conference Computer Vision; 1999; pp. 1-6.
Farsiu et al: "Fast and robust multiframe super resolution", IEEE Trans. Image Processing 13 (2004); pp. 1327-1344.
Freeman et al: "Example-based super-resolution", IEEE Computer Graph. Appl. 22 (2002); pp. 56-65.
Freeman et al: "Learning low-level vision", International Journal Comp. Vis. 40 (2000); pp. 1-47.
Glasner et al :"Super-resolution from a single image", IEEE 12th International Conference on Computer Vision, Sep. 29, 2009, pp. 249-356.
Hertzmann et al: "Image analogies", ACM Cpmp. Graphics Interactive Tech. (2001); pp. 1-14.
Irani et al: "Improving resolution by image registration"; CVGIP: Graphical Model Image Process. 53 (1991); vol. 53, No. 3, May 1991; vol. 53, No. 3, May 1991; pp. 231-239.
Irani et al: "Motion analysis for image enheancement: resolution, occlusion and transparency", JVCIP 19931 pp. 1-24.
Lin et al: "Fundamental limited of reconstruction-based super resolution algorithms under local translation", IEEE Trans. Pattern Anal. Mach. (Jan. 2004); vol. 26, No. 1; pp. 83-97.
Rowies et al: "Nonlinear Dimensionality Reduction by Local Linear Embedding", Science vol. 290 (Dec. 22, 2000); pp. 2323-2326.
Sugimoto et al "Inter-frame coding with template matching spatio-temporal prediction", IEEE Int. Conference Image Processing, 2004; pp. 465-468.
Wei et al: "Fast Texture synthesis using tree-structured vector quantization", ACM Comp. Graphics Interactive Tech. 2000; pp. 1-10.
Yang et al "Exploiting self-similarities for single image Super-Resolution", Computer Vision A ACCV. Springer Berlin, Nov. 8, 2010, pp. 497-510.
Search Report Dated Dec. 16, 2013.
Liu et al., "Wavelet Domain Image Super-Resolution Reconstruction Based on Image Pyramid and Cycle Spinning", Journal of Physics: Conference Series, vol. 48, (2006), pp. 417-421.
Park et al., "Robust Super-Resolution of Face Images by Iterative Compensating Neighborhood Relationships", 2007 Biometrics Symposium, Baltimore, Maryland, USA, Sep. 11, 2007, pp. 1-5.
Su et al., "Neighborhood Issue in Single-Frame Image Super-Resolution", 2005 IEEE International Conference on Multimedia and Expo, Amsterdam, the Netherlands, Jul. 6, 2005, pp. 1-4.
Tang et al., "Local Semi-Supervised Regression for Single-Image Super-Resolution", 2011 IEEE 13th international Workshop on Multimedia Signal Processing (Mmsp 2011), Hangzhou, China, Oct. 17, 2011, pp. 1-5.
Yoichi Nishino et al, Image Super-Resolution Using Dictionaries Learnt by a Shift-Invariant Sparse Coding, IEICE Tech. Rep., May 29-30, 2008, pp. 1-6, vol. 108, No. 71, SIP2008-27.

METHOD AND APPARATUS FOR PERFORMING HIERARCHICAL SUPER-RESOLUTION OF AN INPUT IMAGE

This application claims the benefit, under 35 U.S.C. §365 of International Application PCT/EP2013/054272, filed Mar. 4, 2013, which was published in accordance with PCT Article 21(2) on Sep. 12, 2013 in English and which claims the benefit of European patent application No. 12305264.9, filed Mar. 5, 2012.

FIELD OF THE INVENTION

The invention relates to a method for performing hierarchical super-resolution of an input image, and to an apparatus for performing hierarchical super-resolution of an input image. The invention relates also to a method for averaging of pixels in performing super-resolution by using block-based predictions, and to an apparatus for averaging of pixels in performing super-resolution by using block-based predictions.

BACKGROUND

Super-resolution (SR) refers to a process of recovering the missing high-frequency details of a given low-resolution (LR) image. In other words, SR produces a high-resolution (HR) image with clear and detailed contents using one or more LR observations. One class of SR processes relates to Single Image Super-Resolution.

Various image up-sampling techniques are known, including some that use a single low-resolution image and some that are not using any external information or database. Some SR techniques use upsampling of spatial texture patches for giving local geometric similarities of LR and HR image patch spaces.

The following is an outline of how this problem is currently addressed. Classical SR methods, e.g. [1]-[3], try to fuse a set of LR images in order to recover the unknown HR image. These algorithms assume that the missing high-frequency information is distributed implicitly along the LR observations, and the HR image can be recovered successfully if there is enough number of LR images. The quality of the reconstructed HR image therefore depends highly on the amount of data available in the LR images.

However, in practice, insufficient number of LR observations, registration (i.e. motion estimation) errors, and unknown point spread function (PSF) limit the applicability of these multi-image SR methods to small upscaling ratios, which is less than 2 under general conditions [4].

Example-based methods have been proposed in order to overcome the limitations of classical multi-image SR. In [5], LR and HR image patch pairs are collected from other natural images, and low- and high-frequency relations of these patches are learned via a Markov network using belief propagation. This method has later been simplified in [6] to give a fast and approximate solution to the Markov network, with a sequence of predictions of HR patches by a nearest neighbor (NN) search from the database of the collected training examples. The missing high-frequency details are estimated ("hallucinated") according to the local LR image information and the high-frequency patch compatibilities of the recently recovered part of the HR image. Similar NN-based approaches have largely been exploited in the context of example-based texture synthesis [7]-[9], and have been shown to be beneficial in different image processing applications, e.g. in [10]-[12].

Nevertheless, one is required here to construct databases of enormous numbers of training LR and HR patch pairs in order to be representative enough for SR, and thus, this is computationally intractable or unusable for most of the practical applications.

SUMMARY OF THE INVENTION

The invention improves known image up-sampling techniques by using a super-resolution (SR) method from a single low-resolution image, without using any external information or database. At least one embodiment of the invention concerns principally the use of spatial texture patches giving local geometric similarities of low-resolution (LR) and high-resolution (HR) image patch spaces.

At least one embodiment of the present invention improves the image up-sampling technique by using a pyramidal super-resolution method from a single LR image, without using any external information or database. In one embodiment, the mean of each block is calculated and subtracted before processing the block, and added again later. It is noted that the terms block and patch are used synonymously herein, as usual in the art.

In general, the invention concerns intrinsic single image SR, and relies on local geometric similarities of LR and HR image patch spaces. The intrinsic geometric property of an input (mean subtracted or not, see below) LR patch neighborhood is obtained from the input LR patch and its K nearest neighbors (K-NN) taken from across scales of the LR image (i.e. from different scales).

According to one embodiment of the invention, a method for performing hierarchical SR of an input image comprises steps of dividing the input image into patches, performing spatial decomposition of the input image to at least two lower decomposition levels, wherein at least two lower decomposition level images are obtained, and generating an empty upsampled frame, wherein for each patch of the input image a corresponding upsampled patch in the upsampled frame is generated. Then, for each current patch of the input image, the method comprises performing the steps of searching in the lower decomposition level images one or more similar patches of same size as the current patch, for each of the similar patches found in the searching step determining its respective parent patch in the next higher decomposition level, weighting the determined parent patches, accumulating the weighted determined parent patches to is obtain an upsampled high-resolution patch, and replacing in the up-sampled frame an upsampled patch corresponding to the current patch with the upsampled high-resolution patch.

In one embodiment, the invention concerns a corresponding apparatus, as disclosed in claim 12 and described below.

In one embodiment, the local LR geometry is characterized linearly with the locally linear embedding (LLE) [13] reconstruction coefficients of the input LR patch from its K-NN. The HR embedding is then estimated ("hallucinated") from the corresponding (mean subtracted or not, see below) HR parents of the found K-NN of the input LR patch, by assuming that the local LR geometry has been preserved in the HR patch space. An estimate of the current HR patch is then obtained by adding the mean value of the input LR patch.

In one embodiment, the invention relates to a method for averaging of pixels in performing super-resolution by using block-based predictions, wherein LLE is used and wherein the pixels are from source blocks that are overlapping. The method comprises steps of determining sparsity factors of the source blocks, and combining the pixels from the source blocks according to weighting factors, wherein the sparsity factor of each source block is used as a weighting factor for its pixels.

In one embodiment, the invention relates to an apparatus for averaging of pixels in performing super-resolution by using block-based predictions, wherein LLE is used and wherein the pixels are from source blocks that are overlapping. The apparatus comprises a first processing unit for determining sparsity factors of the source blocks, and a second processing unit for combining the pixels from the source blocks according to weighting factors, wherein the sparsity factor of each source block is used as a weighting factor for its pixels. The first and second processing units may be implemented as a single processing unit.

Further objects, features and advantages of the invention will become apparent from a consideration of the following description and the appended claims when taken in connection with the accompanying drawings.

BRIEF DESCRIPTION OF THE DRAWINGS

Exemplary embodiments of the invention are described with reference to the accompanying drawings, which show in FIG. 1 the structure of upsampling a single-image for achieving super-resolution through across-scale neighbor embedding.

DETAILED DESCRIPTION

Figure 1:
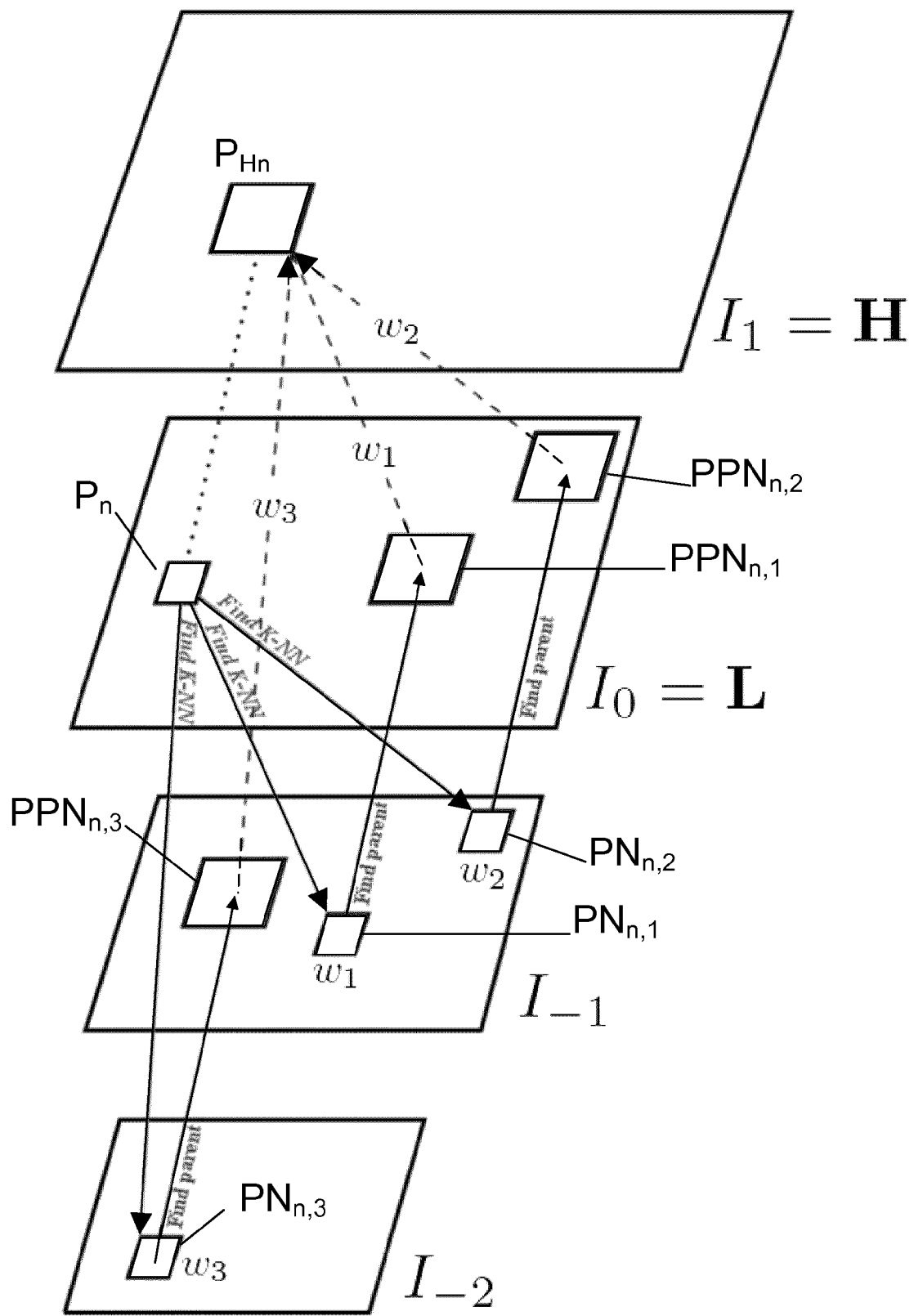

FIG. 1 shows Single-image super-resolution through across-scale neighbor embedding, as explained in the following. For performing a super resolution of a low resolution input $I_0$ image, the algorithm can be resumed as following.

Figure 9:
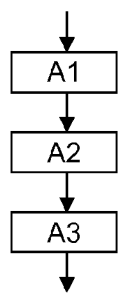
FIG. 9 a high-level flow-chart of a method according to one embodiment of the invention.

A high-level flow-chart of the algorithm, as shown in FIG. 9, comprises at least a step A1 of L+1 levels Pyramid construction, a step A2 of LR patch estimation and respective HR patch reconstruction, and a step A3 of overlapping of the LR/HR patch estimations.

First, the L+1 levels Pyramid construction process A1 is described. It comprises the following steps, which are explained with reference to FIG. 1.

The input $I_0$ (LR, pyramid level I=0) image is filtered and downsampled, of a given ratio $r_d$, by a low pass filter, wherein the low frequency image $I_{-1}$ is obtained. The previously downsampled image $I_{-1}$ is filtered and down sampled again by a low pass filter, wherein the low frequency image $I_{-2}$ is obtained, etc. By repetition of this process, more spatial decomposition levels can be obtained. Finally, a down sampled image $I_{-L+2}$ is filtered and down-sampled by a low pass filter, wherein the last low frequency image $I_{-L+1}$ is obtained. An empty HR image $I_1$ is created, wherein ratio of the sizes of $I_1$ and $I_0$ is of the inverse ratio than $I_0$ to $I_{-1}$, that is: $I_1/I_0 = I_0/I_{-1}$, or: the upsampling factor $r_u$ is the inverse of the downsampling factor $r_d$.

Finally, the pyramid is composed of Level 1 (bottom of the upside-down pyramid shown in FIG. 1) being the HR image resolution (which is to be reconstructed), Level 0 being the input LR image, and Level $-L+2$ being the lowest resolution image (top of the upside-down pyramid in FIG. 1).

Second, the step A2 of LR patch estimation and HR patch reconstruction from lowest frequency patches is described. Two alternative embodiments are disclosed: one is called "Luminance based", and the other is called "Gradient based".

The Luminance based solution comprises LR patch estimation, HR patch reconstruction and HR image reconstruction as follows.

LR patch estimation comprises steps of determining in the input image $I_0$ a first patch $P_n$ at a first position, wherein n is the index of the current path in $I_0$, searching the K nearest neighbors (K-NN) taken from lower scales $I_{-1}, I_{-2}, \ldots, I_{-L+1}$ of the LR image $I_0$, and characterizing linearly with a locally linear embedding (e.g. Locally Linear Embedding, LLE from [13]) reconstruction coefficients of the input LR patch $P_n$ from its K-NN $PN_{n,k}$ with the respective weighting factor $w_{n,k}$. The K-NN being the K best matching patches $PN_{n,k}$ (with the previous first patch $P_0$) according to a given criterion (e.g. SAD, SSE). SAD (sum-of-absolute-differences) and SSE (sum-of-squared-errors) are commonly known criteria in the technical field concerned.

HR patch reconstruction comprises building (also referred to as synthesizing) the HR patch $P_{Hn}$ embedding from the corresponding HR parents $PPN_{n,k}$ of the found K-NN of the input LR patch $PN_{n,k}$ with the respective previous weighting factor $w_{n,k}$, in which precisely the current HR $P_{Hn}$ patch of the $I_1$ image is the homologous of the $P_n$ patch of the input image $I_0$, and the HR parents $PPN_{n,k}$ issuing from $I_0$, $I_{-1}, \ldots, I_{-L+2}$ images of the pyramid are the homologous of the $PN_{n,k}$ patches issuing from the $I_{-1}, I_{-2}, \ldots, I_{-L+1}$ images of the pyramid.

HR image reconstruction comprises repeating the LR patch estimation and HR patch reconstruction for all the patches/couples of the patches of the LR/HR image.

The Gradient based solution (i.e. mean subtracted of luminance) comprises LR patch estimation, HR patch reconstruction and HR image reconstruction as follows.

LR patch estimation comprises determining in the input image $I_0$ a first patch $P_n$ at a first position, wherein n is the index of the current path in $I_0$ and the mean of the block is subtracted, searching the K nearest neighbors K-NN taken from lower scales $I_{-1}, I_{-2}, \ldots, I_{-L+1}$ of the LR image $I_0$, and characterizing linearly with a locally linear embedding (e.g. LLE) reconstruction coefficients of the input LR patch $P_n$ from its K-NN $PN_{n,k}$ with the respective weighting factor $w_{n,k}$. The K-NN are the K best matching patches $PN_{n,k}$ (with the previous first patch $P_0$) according to a given criterion (e.g. SAD, SSE), wherein at each block $PN_{n,k}$ the mean (i.e. its own individual mean) is also subtracted.

HR patch reconstruction comprises building (also referred to as synthesizing) the HR patch $P_{Hn}$ embedding from the corresponding (with the mean, i.e. its own mean, subtracted)

HR parents $PPN_{n,k}$ of the found K-NN of the input LR patch $PN_{n,k}$ with the respective previous weighting factor $w_{n,k}$, in which precisely: the current HR $P_{Hn}$ patch of the $I_1$ image is the homologous of the $P_n$ patch of the input image $I_0$, and the HR parents $PPN_{n,k}$ issuing from $I_0, I_{-1}, \ldots, I_{-L+2}$ images of the pyramid are the homologous of the $PN_{n,k}$ patches issuing from the $I_{-1}, I_{-2}, \ldots, I_{-L+1}$ images of the pyramid. Finally, the mean value of the input LR (input $I_0$ image) patch is added to the current reconstructed HR patch.

HR image reconstruction comprises repeating the LR patch estimation and HR patch reconstruction for all the patches/couples of the LR/HR images.

The next step A3, after L+1 levels pyramid reconstruction A1 and LR patch estimation and HR patch reconstruction A2, is the overlapping of LR/HR patch estimations, i.e. synthesis from lowest frequency patches. It comprises, in one embodiment, at least one of mean averaging and sparsity weighting averaging.

Mean averaging comprises that, after for each patch in the LR image $I_0$ a HR embedding has been calculated, an overlap between patches is allowed in order to average, for each HR pixel, all the pixel contributions issued from the reconstructed blocks overlapping each current pixel.

Sparsity weighting averaging comprises that the estimated overlap region pixels are then weighted according to a sparsity-based measure, in order to preserve the dominant structures. Then the weighting average is realized according to the sparsity degree of the block in which the overlapped pixel is issued. The sparsity weighting factor can be a function of the number of DCT coefficients of the block, or more complex the number of atoms representing the block in case of sparse representation such as "Matching Pursuit" (MP) or "Orthogonal Matching Pursuit" (OMP).

In one embodiment, an additional final step is iterative back projection (not shown in FIG. 9). This step consists in the application of a known iterative back projection process, which ensures that the recovered HR image produces the same reference LR image as observed. That approach resides in adding recursively (at the iteration k), to the reconstructed $HR_k$ image result, the up-sampled (and low pass filtered) difference between the original input LR image $I_0$ and the down sampled $HR_{k-1}$ image. The operation is repeated for a predefined maximum number of iterations. Usually, e.g. 20 iterations are sufficient. A generally applicable range is 10-30 iterations, however less iterations may be sufficient in some cases.

Various patch sizes are possible. Particularly advantageous patch sizes for low resolution are 3×3, 5×5 and 7×7 pixels (with 5×5 giving the best results at least for 2×2 up-scaling). For HR, the homologous sizes are: 6×6, 10×10 and 14×14 pixels. Also, various other subsampling factors from one image to the next can be used, different from 2. It is possible to extend the method for factors of e.g. 3 or 4. This extension is achieved by adjusting LR and HR patch sizes, and down-scaled versions of the LR image. Further, as another option, up-sampling by a factor of 2 can be applied twice in order to get an up-scaling of factor 4, or up-sampling by a factor of 3 can be applied twice in order to get an up-scaling of factor 6 etc.

For each patch in the LR image, a HR embedding preserving the local geometry of the LR neighborhood is calculated. An overlap between patches is allowed as much as possible in order to enforce the local compatibility and smoothness constraints in the target HR image. Exemplarily, the patches overlap by 1 pixel or 2 pixels per dimension.

The overlap region pixels can be then linearly combined depending on a sparse representations based weighting measure. In this method, a concatenation of input LR patch and estimated HR patch can be decomposed over a dictionary which is composed of LR and HR image patches taken from the LR image and its across scales.

In one embodiment, the patches are weighted depending on the sparseness of their representation, i.e., the sparsest representation is given the highest weight, and so on. In one embodiment, the weight depends on the number of non-zero coefficients (e.g. DCT coefficients) (after thresholding) of the patch. In one embodiment, the weights are then calculated using an exponential function, as shown in FIG. 2, according to:

$$W = \exp(f(\text{number of non-zero coefficient}))$$

Figure 2:
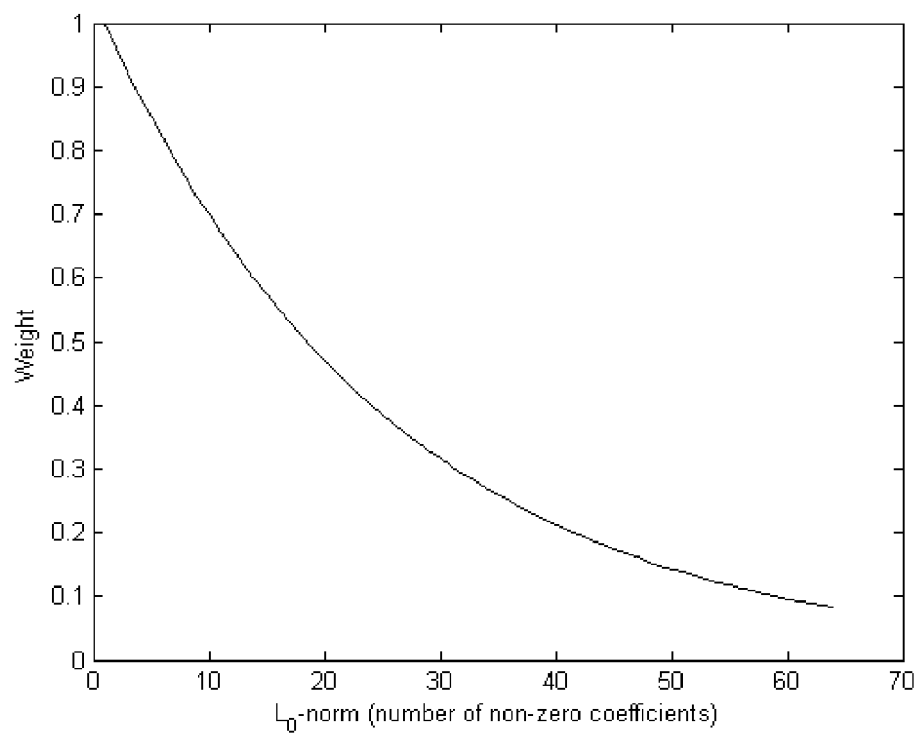
FIG. 2 an exemplary relationship between the number of non-zero coefficients in a block and a normalized weighting factor that is to be used for the block.

FIG. 2 shows an exemplary relationship between the number of non-zero coefficients in a block (actually "non-zero" means above a minimum threshold that is near zero) and a normalized weighting factor that is to be used for the block. As shown, the more non-zero coefficients a block has, the lower is the weighting factor.

If a sparse representation of the patch (e.g. MP, OMP) is used, here in the context of sparse representation an "atom" (issuing of a dictionary which is composed of N atoms) is similar to a "basis function" of DCT, knowing an atom and the basis function are represented in the spatial domain. Here the weight depends also on the number of non-zero coefficients.

Finally, to satisfy the global reconstruction constraint (i.e.: the recovered HR image should produce the same reference LR image as observed), an iterative back projection method [1],[2] is adopted in one embodiment. Then, the final HR image estimate is assumed to be the result from the back-projection algorithm S9.

In one embodiment, the overall algorithm is composed of:
a pyramidal SR algorithm, e.g. LLE based,
plus sparsity averaging (of the reconstructed overlapped blocks)
and (optionally)+back projection.

Advantageously, an algorithm according to the invention outperforms the algorithms known in the art.

Figure 3:
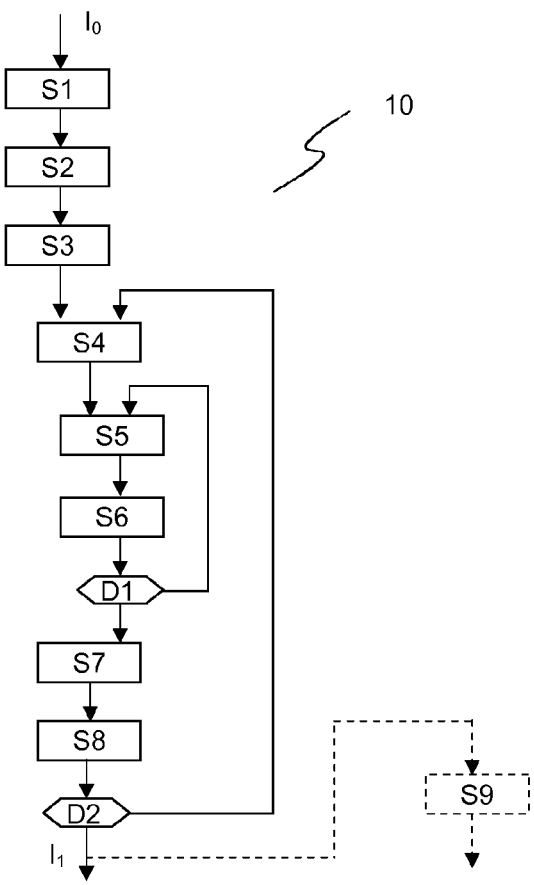
FIG. 3 a flow-chart of a method for performing hierarchical super-resolution of an input image, according to one embodiment of the invention.

FIG. 3 shows a flow-chart of a method for performing hierarchical super-resolution of an input image, according to one embodiment of the invention. In this embodiment, a method 10 for performing hierarchical super-resolution of an input image $I_0$ comprises steps of dividing S1 the input image $I_0$ into patches $P_n$, performing S2 spatial decomposition of the input image $I_0$ to at least two lower decomposition levels, wherein at least two lower decomposition level images $I_{-1}, I_{-2}$ are obtained, and generating S3 an empty upsampled frame $I_1$, wherein for each patch $P_n$ of the input image a corresponding upsampled patch in the upsampled frame $I_1$ is generated. Then, for each current patch $P_n$ of the input image $I_0$ the following steps are performed.

In the lower decomposition level images $I_{-1}, I_{-2}$ one or more similar patches $PN_{n,1}, PN_{n,2}, PN_{n,3}$ of same size as the current patch, are searched S4. For each of the similar patches $PN_{n,1}, PN_{n,2}, PN_{n,3}$ found in the searching step, its respective parent patch $PPN_{n,1}, PPN_{n,2}, PPN_{n,3}$ in the next higher decomposition level $I_0, I_{-1}$ is determined S5. The determined parent patches $PPN_{n,1}, PPN_{n,2}, PPN_{n,3}$ are weighted S6 with weighting factors $w_1, w_2, w_3$, wherein weighted determined parent patches are obtained. The weighted determined parent patches are accumulated S7, wherein an upsampled high-resolution patch $P_{Hn}$ is obtained. Finally, an upsampled patch corresponding to the current patch $I_0$ is replaced S8 in the up-sampled frame $I_1$ with the upsampled high-resolution patch $P_{Hn}$.

A first decision step D1 determines whether or not more all potentially similar patches (in the various lower levels) have been investigated, and a second decision step D2 determines whether or not all patches of the input image have been processed.

Note that in the determining step S5 the parent patches $PPN_{n,1}$, $PPN_{n,2}$, $PPN_{n,3}$ found in the next higher decomposition level $I_0$, $I_{-1}$ are larger than the respective current patch.

Figure 4:
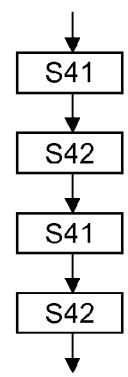
FIG. 4 a detail flow-chart of the step of searching similar patches in the lower decomposition level images.

FIG. 4 shows a detail flow-chart of one embodiment of the step of searching similar patches in the lower decomposition level images. In this embodiment, a mean of each current patch is calculated S41 and a mean of each similar patch is calculated S42. The mean of the current patch is subtracted S43 from each pixel value of the current patch.

The mean of each similar patch is subtracted S44 from each pixel value of the respective similar patch. This is performed in the step of searching in the lower decomposition level images $I_{-1}$, $I_{-2}$ one or more similar patches $PN_{n,1}$, $PN_{n,2}$, $PN_{n,3}$. Note that step S43 can be performed before or after step S42.

Figure 5:
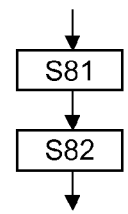
FIG. 5 a detail flow-chart of the step of replacing an upsampled patch in the up-sampled frame.

FIG. 5 shows a detail flow-chart of one embodiment of the step of replacing an upsampled patch in the upsampled frame. In this embodiment, the mean of each current patch is added S81 to each pixel value of the upsampled patch corresponding to the current patch, and then the actual insertion S82 of the upsampled patch in the up-sampled frame $I_1$ is done, whereby the upsampled patch replaces the default patch in the HR image.

Figure 6:
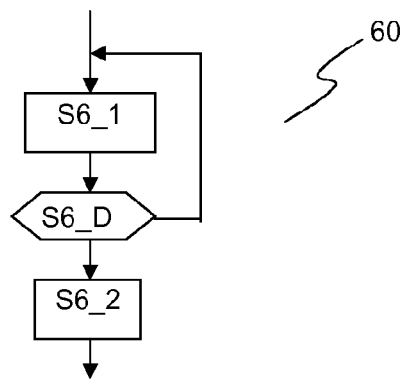
FIG. 6 a flow-chart of a method for averaging of pixels in performing super-resolution, according to one embodiment of the invention.

FIG. 6 shows a flow-chart of a method for averaging of pixels in performing SR, according to one embodiment of the invention. The method 60 for averaging of pixels in performing super-resolution by using block-based predictions, wherein LLE is used and wherein the pixels are from source blocks that are overlapping, comprises steps of determining S6_1 sparsity factors of the source blocks, and combining S6_2 the pixels from the source blocks according to weighting factors, wherein the sparsity factor of each source block is used as a weighting factor for its pixels.

Figure 7:
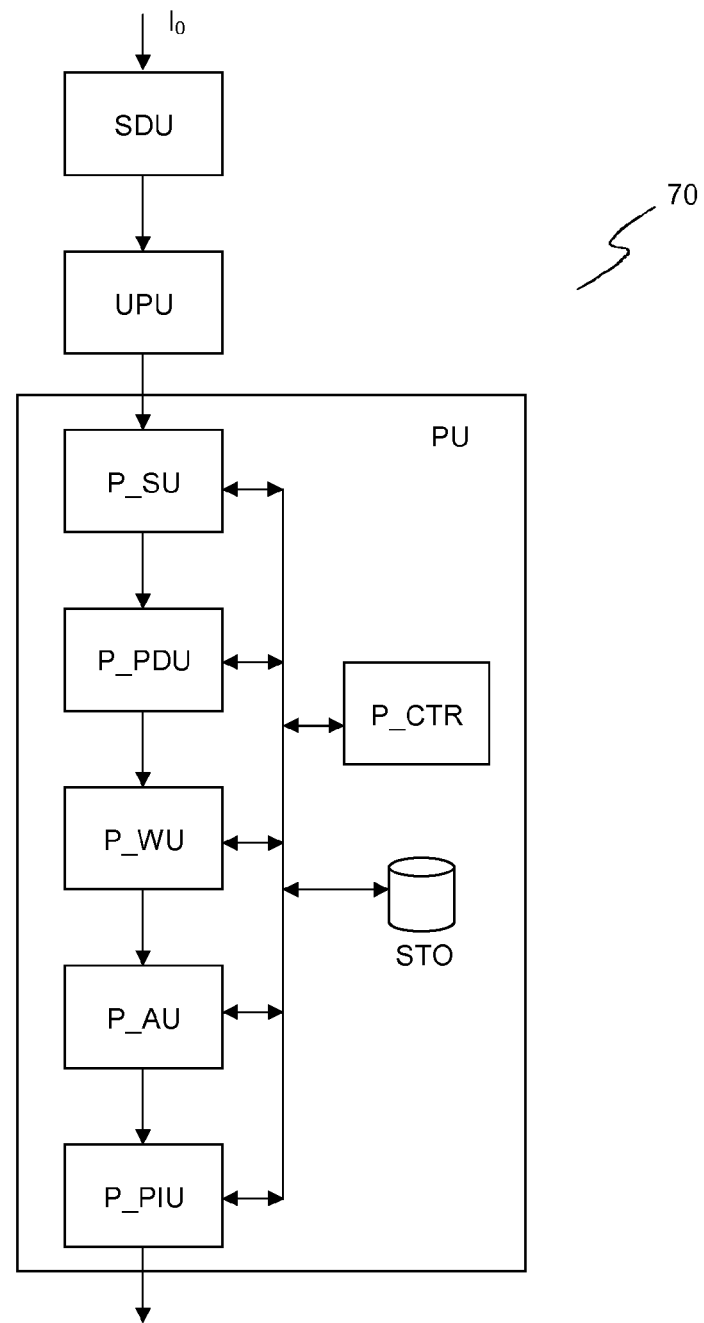
FIG. 7 the structure of an apparatus for performing hierarchical super-resolution of an input image.

FIG. 7 shows the structure of an apparatus for performing hierarchical super-resolution of an input image, wherein the input image $I_0$ is divided into patches $P_n$. The apparatus 70 comprises a spatial decomposition unit SDU, an upsampling unit UPU, and a processing unit PU. Further units, which may be separate units or part of the processing unit, are a search unit P_SU, a parent patch determining unit P_PDU, a weighting unit P_WU, an accumulation unit P_AU and a patch insertion unit P_PIU (or patch replacement unit, see above).

The spatial decomposition unit SDU performs spatial decomposition of the input image $I_0$ to at least two lower decomposition levels, wherein at least two lower decomposition level images $I_{-1}$, $I_{-2}$ with different spatial resolutions are obtained.

The upsampling unit UPU generates an empty upsampled frame $I_1$, wherein for each patch $P_n$ of the input image a corresponding upsampled patch in the upsampled frame $I_1$ is generated.

In one embodiment, the processing unit PU performs for each current patch $P_n$ of the input image $I_0$ the steps of searching in the lower decomposition level images $I_{-1}$, $I_{-2}$ one or more similar patches $PN_{n,1}$, $PN_{n,2}$, $PN_{n,3}$ of same size as the current patch, for each of the similar patches $PN_{n,1}$, $PN_{n,2}$, $PN_{n,3}$ found in the searching step, determining its respective parent patch $PPN_{n,1}$, $PPN_{n,2}$, $PPN_{n,3}$ in the next higher decomposition level $I_0$, $I_{-1}$, wherein the parent patches are larger than the current patch, weighting the determined parent patches $PPN_{n,1}$, $PPN_{n,2}$, $PPN_{n,3}$, wherein weighted determined parent patches are obtained, accumulating the weighted determined parent patches, wherein an upsampled high-resolution patch $P_{Hn}$ is obtained, and replacing in the up-sampled frame $I_1$ an upsampled patch corresponding to the current patch $I_0$ with the upsampled high-resolution patch $P_{Hn}$.

In other embodiments, one or more of the following separate units are used.

In one embodiment, the searching in the lower decomposition level images $I_{-1}$, $I_{-2}$ one or more similar patches $PN_{n,1}$, $PN_{n,2}$, $PN_{n,3}$ of same size as the current patch is done by a search unit P_SU.

In one embodiment, the determining, for each of the similar patches $PN_{n,1}$, $PN_{n,2}$, $PN_{n,3}$ found in the searching step, a respective parent patch $PPN_{n,1}$, $PPN_{n,2}$, $PPN_{n,3}$ in the next higher decomposition level is done by a parent patch determining unit P_PDU. Note that generally the parent patches are larger than the current patch (see FIG. 1).

In one embodiment, the weighting the determined parent patches $PPN_{n,1}$, $PPN_{n,2}$, $PPN_{n,3}$ in order to obtain weighted determined parent patches is done by a weighting unit P_WU. In one embodiment, the accumulating the weighted determined parent patches in order to obtain an upsampled high-resolution patch $P_{Hn}$ is done by an accumulation unit P_AU. In one embodiment, the replacing an upsampled patch corresponding to the current patch $I_0$ with the upsampled high-resolution patch $P_{Hn}$ in the up-sampled frame $I_1$ is done by an insertion unit P_PIU.

Figure 8:
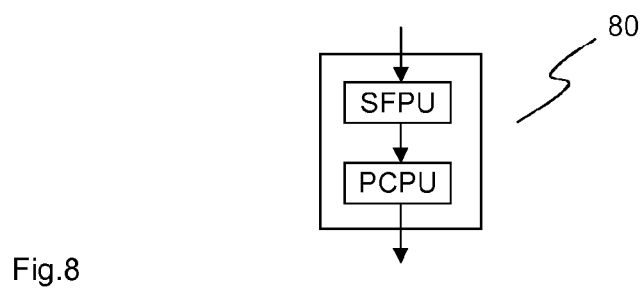
FIG. 8 the structure of an apparatus for averaging of pixels in performing super-resolution.

FIG. 8 shows the structure of an apparatus for averaging of pixels in performing super-resolution, wherein Local Linear Embedding (LLE) is used and wherein the pixels are from source blocks that are overlapping. The apparatus 80 comprises a first processing unit, e.g. a sparsity determining processing unit SFPU, for determining sparsity factors of the source blocks, and a second processing unit, e.g. a pixel combining processing unit PCPU, for combining the pixels from the source blocks according to weighting factors, wherein the sparsity factor of each source block is used as a weighting factor for its pixels.

In general, the present invention relates to at least one of a hierarchical SR algorithm based on self content neighboring patches information that is based on pyramidal decomposition, with or without subtracting the mean of the block, and optimal pixel averaging of block-based predictions using a sparsity factor instead of the classical averaging in the context of LLE SR techniques.

An advantage of the invention is that the invention improves the performance of rendering up-sampled images. Up-sampled images can be rendered quicker and with reduced computation.

Possible advantageous applications of the invention comprise video distribution and display technologies, and applications related to video compression (e.g. spatial scalability) and content representation.

The disclosed method can be implemented in an apparatus for performing the method, which has separate units, each for performing one of the steps. Further, the method can be computer-implemented for execution on a processor.

In one embodiment of the invention, a computer-readable storage medium comprises program data that, when executed on a processor, cause the processor to perform a method for performing hierarchical super-resolution of an input image, as disclosed above with reference to FIGS. 1 and 3.

In one embodiment of the invention, a computer-readable storage medium comprises program data that, when executed on a processor, cause the processor to perform a method for averaging pixels in performing super-resolution by using block-based predictions, as disclosed above with reference to FIG. 6.

In one embodiment, the invention concerns a method for performing hierarchical super-resolution based on self content neighboring patches information, comprising a step of pyramidal decomposition. In one embodiment, the mean of a block is subtracted. In another embodiment, the mean of a block is not subtracted. In one embodiment, the pyramidal super-resolution algorithm includes an algorithm giving a weighted combination, wherein weights for said weighted combination are determined by solving a constrained least square problem, such as a neighbors embedding algorithm. In one embodiment, the pyramidal super-resolution algorithm is a neighbors embedding algorithm such as LLE or non-negative matrix factorization (NMF).

In one embodiment, the invention concerns a method for optimal pixel averaging of block-based predictions, especially in the context of LLE super-resolution, using a sparsity factor (instead of classical averaging). In one embodiment, the sparsity factor is used as a weighting factor.

In one embodiment of the invention, a method 10 for performing hierarchical super-resolution of an input image $I_0$, comprises steps of dividing S1 the input image $I_0$ into patches $P_n$, performing S2 spatial decomposition of the input image to at least two lower decomposition levels, wherein at least two lower decomposition level images are obtained, generating S3 an empty upsampled frame $I_1$, wherein for each patch $P_n$ of the input image a corresponding upsampled patch in the upsampled frame $I_1$ is generated, and performing, for each current patch $P_n$ of the input image $I_0$, the steps of searching S4 in the lower decomposition level images $I_{-1}$, $I_{-2}$ one or more similar patches $PN_{n,1}$, $PN_{n,2}$, $PN_{n,3}$ of same size as the current patch, determining S5, for each of the similar patches $PN_{n,1}$, $PN_{n,2}$, $PN_{n,3}$ found in the searching step, its respective parent patch $PPN_{n,1}$, $PPN_{n,2}$, $PPN_{n,3}$ in the next higher decomposition level $I_0$, $I_{-1}$, wherein the parent patches are larger than the current patch, weighting S6 the determined parent patches $PPN_{n,1}$, $PPN_{n,2}$, $PPN_{n,3}$ using individual weights $w_1$, $w_2$, $w_3$, wherein weighted determined parent patches are obtained, accumulating S7 the weighted determined parent patches, wherein an upsampled high-resolution patch $P_{Hn}$ is obtained, and replacing S8, in the up-sampled frame $I_1$, an upsampled patch corresponding to the current patch $I_0$ with the upsampled high-resolution patch $P_{Hn}$.

In one embodiment, the method comprises in the step of searching similar patches in the lower decomposition level images, calculating a mean of each current patch and a mean of each similar patch S41, S42 and subtracting S43, S44 the mean from each pixel value of the respective patch. Further, in the step of replacing, the mean of each current patch is added S81 to each pixel value of the upsampled patch corresponding to the current patch.

In one embodiment, the method comprises, in the step of searching in the lower decomposition level images one or more similar patches, determining a similarity according to a luminance value of the pixels in the patches.

In one embodiment, the method comprises, in the step of searching in the lower decomposition level images one or more similar patches, determining a similarity according to a luminance gradient of the patches.

In one embodiment, the method comprises determining weights used for said weighting from a sparsity of the patch, wherein the sparsity corresponds to a number of non-zero DCT coefficients in the patch.

In one embodiment, the method comprises that the patches the input image are partially overlapping, and therefore also the corresponding upsampled patches in the upsampled image are partially overlapping.

In one embodiment, the method comprises, in the steps of weighting and accumulating, calculating a weighted combination, wherein weights for said weighted combination are determined by solving a constrained least square problem. One example mentioned above is the well-known least square algorithm.

In one embodiment, the method comprises, in the pyramidal super-resolution algorithm, a neighbors embedding algorithm. Examples are locally linear embedding (LLE) or non-negative matrix factorization (NMF).

In one embodiment, the method comprises an additional final step of performing iterative back projection (IBP).

In one embodiment, the method comprises determining the parent patch in the next higher decomposition level according to its relative coordinates. That is, the relative coordinates of a patch in the lower level and those of its parent patch in the higher decomposition level are the same (such as e.g. at 10% of the height and 40% of the width). This may in principle comprise determining the relative coordinates of a patch in the lower level, determining a position having the same relative coordinates in the higher decomposition level, and placing the parent patch at the determined position in the higher decomposition level.

In one embodiment, the invention relates to a method 60 for averaging of pixels in performing super-resolution by using block-based predictions, wherein Local Linear Embedding is used and wherein the pixels are from source blocks that are overlapping. The method comprises steps of determining S6_1 sparsity factors of the source blocks, and combining S6_2 the pixels from the source blocks according to weighting factors, wherein the sparsity factor of each source block is used as a weighting factor for its pixels.

In one embodiment, the invention relates to an apparatus 70 for performing hierarchical super-resolution of an input image $I_0$, wherein the input image $I_0$ is divided into patches $P_n$. The apparatus comprises a spatial decomposition unit SDU for performing spatial decomposition of the input image $I_0$ to at least two lower decomposition levels, wherein at least two lower decomposition level images ($I_{-1}$, $I_{-2}$) are obtained, an upsampling unit UPU for generating an empty upsampled frame $I_1$, wherein for each patch $P_n$ of the input image a corresponding upsampled patch in the upsampled frame $I_1$ is generated, and a processing unit PU for performing for each current patch $P_n$ of the input image $I_0$ the steps of searching in the lower decomposition level images $I_{-1}$, $I_{-2}$ one or more similar patches $PN_{n,1}$, $PN_{n,2}$, $PN_{n,3}$ of same size as the current patch, determining, for each of the similar patches $PN_{n,1}$, $PN_{n,2}$, $PN_{n,3}$ found during the searching, its respective parent patch $PPN_{n,1}$, $PPN_{n,2}$, $PPN_{n,3}$ in the next higher decomposition level $I_0$, $I_{-1}$, wherein the parent patches are larger than the current patch, weighting the determined parent patches $PPN_{n,1}$, $PPN_{n,2}$, $PPN_{n,3}$, wherein weighted determined parent patches are obtained, accumulating the weighted determined parent patches, wherein an upsampled high-resolution patch $P_{Hn}$ is obtained, and replacing or inserting, in the up-sampled frame $I_1$, an upsampled patch corresponding to the current patch $I_0$ with the upsampled high-resolution patch $P_{Hn}$. Generally, the apparatus may also comprise an image dividing unit for dividing the input image $I_0$ into patches $P_n$, so that also images that are not already divided may be processed.

As described above, the apparatus may comprise one or more separate units of a search unit P_SU, a parent patch determining unit P_PDU, a weighting unit P_WU, an accumulation unit P_AU and a patch insertion unit P_PIU.

In one embodiment of the apparatus, in the unit for searching in the lower decomposition level images $I_{-1}$, $I_{-2}$ one or more similar patches $PN_{n,1}$, $PN_{n,2}$, $PN_{n,3}$, a mean of each current patch and a mean of each similar patch is calculated and subtracted from each pixel value of the respective patch, and in the unit P_PIU for patch insertion or patch replacement, the mean of each current patch is added to each pixel value of the upsampled patch corresponding to the current patch.

In one embodiment, the apparatus further comprises an additional iterative back projection unit.

In one embodiment, the invention relates to an apparatus 80 for averaging of pixels in performing super-resolution by using block-based predictions, wherein Local Linear Embedding is used and wherein the pixels are from source blocks that are overlapping. The apparatus comprises a first processing unit SFPU for determining sparsity factors of the source blocks, and a second processing unit PCPU for combining the pixels from the source blocks according to weighting factors, wherein the sparsity factor of each source block is used as a weighting factor for its pixels.

While there has been shown, described, and pointed out fundamental novel features of the present invention as applied to preferred embodiments thereof, it will be understood that various omissions and substitutions and changes in the apparatus and method described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated.

It will be understood that the present invention has been described purely by way of example, and modifications of detail can be made without departing from the scope of the invention.

Each feature disclosed in the description and (where appropriate) the claims and drawings may be provided independently or in any appropriate combination. Features may, where appropriate be implemented in hardware, software, or a combination of the two. Connections may, where applicable, be implemented as wireless connections or wired, not necessarily direct or dedicated, connections.

CITED REFERENCES

[1] Irani, M., Peleg, S.: Improving resolution by image registration. CVGIP: Graphical Models Image Process. 53 (1991)
[2] M. Irani and S. Peleg, "Motion analysis for image enhancement: resolution, occlusion and transparency," JVCIP, (1993)
[3] Farsiu, S., Robinson, M., Elad, M., Milanfar, P.: Fast and robust multiframe super resolution. IEEE Trans. Image Process. 13 (2004)
[4] Lin, Z., Shum, H. Y.: Fundamental limits of reconstruction-based super resolution algorithms under local translation. IEEE Trans. Pattern Anal. Mach. (2004)
[5] Freeman, W. T., Pasztor, E. C., Carmichael, O. T.: Learning low-level vision. Int. J. Comp. Vis. 40 (2000)
[6] Freeman, W. T., Jones, T. R., Pasztor, E. C.: Example-based super-resolution. IEEE Comp. Graph. Appl. 22 (2002)
[7] Efros, A. A., Leung, T. K.: Texture synthesis by non-parametric sampling. In: IEEE Int. Conf. Computer Vis. (1999)
[8] Wei, L. Y., Levoy, M.: Fast texture synthesis using tree-structured vector quantization. In: ACM Comp. Graphics Interactive Tech. (2000)
[9] Ashikhmin, M.: Synthesizing natural textures. In: ACM Symp. Interactive 3D Graph. (2001)
[10] Hertzmann, A., Jacobs, C. E., Oliver, N., Curless, B., Salesin, D. H.: Image analogies. In: ACM Comp. Graphics Interactive Tech. (2001)
[11] Criminisi, A., Perez, P., Toyama, K.: Region _lling and object removal by examplar-based image inpainting. IEEE Trans. Image Process. 13 (2004)
[12] Sugimoto, K., Kobayashi, M., Suzuki, Y., Kato, S., Boon, C. S.: Inter frame coding with template matching spatio-temporal prediction. In: IEEE Int. Conf. Image Process. (2004)
[13] S. Roweis and L. Saul, "Nonlinear dimensionality reduction by locally linear embedding", Science, vol. 290, (2000).

The invention claimed is:

1. A method for performing hierarchical super-resolution of an input image, comprising:
   dividing the input image into patches;
   performing spatial decomposition of the input image to at least two lower decomposition levels, wherein at least two lower decomposition level images are obtained; and
   for each current patch of the input image,
   searching in the lower decomposition level images one or more similar patches of same size as the current patch;
   for each of the similar patches found in the searching, determining its respective parent patch in the next higher decomposition level, wherein the parent patches are larger than the current patch;
   obtaining weighted determined parent patches using a weight determined from a sparsity of the patch, wherein the sparsity corresponds to a number of non-zero DCT coefficients in the patch;
   accumulating the weighted determined parent patches to obtain an upsampled high-resolution patch; and
   replacing an upsampled patch of an upsampled frame corresponding to the current patch with the upsampled high-resolution patch.

2. The method according to claim 1, wherein searching in the lower decomposition level images one or more similar patches, further comprised calculating and subtracting a mean of each current patch and a mean of each similar patch from each pixel value of the respective patch, and wherein in the replacing further comprising adding the mean of each current patch to each pixel value of the upsampled patch corresponding to the current patch.

3. The method according to claim 1, wherein the searching in the lower decomposition level images one or more similar patches further comprises determining a similarity according to a luminance of the pixels in the patches.

4. The method according to claim 1, wherein the searching in the lower decomposition level images one or more similar patches further comprises determining a similarity according to a luminance gradient of the patches.

5. The method according to claim 1, wherein the patches the input image are partially overlapping and the corresponding upsampled patches in the upsampled image are partially overlapping.

6. The method according to claim 1, wherein the weighting and accumulating further comprise calculating a weighted combination, wherein weights for said weighted combination are determined by solving a constrained least square problem.

7. The method according to claim 1, wherein the pyramidal super-resolution algorithm is a neighbors embedding algorithm.

8. The method according to claim 1, further comprising performing back-projection.

9. The method according to claim 1, wherein the parent patch in the next higher decomposition level is determined according to its relative coordinates.

10. A non-transitory Computer-readable storage medium comprising program data that when executed on a processor cause the processor to perform the method according to claim 1.

11. An apparatus for performing hierarchical super-resolution of an input image, wherein the input image is divided into patches, the apparatus comprising:
- a spatial decomposition unit for performing spatial decomposition of the input image to obtain at least two lower decomposition levels; and
- a processing unit adapted to, for each current patch of the input image,
  - search, in a search unit, in the lower decomposition level images one or more similar patches of same size as the current patch; for each of the similar patches found in the searching,
  - determine in a parent patch determining unit its respective parent patch in the next higher decomposition level, wherein the parent patches are larger than the current patch;
  - weight, in a weighting unit, the determined parent patches, wherein a weight used for weighting a patch is determined from a sparsity of the patch, wherein the sparsity corresponds to a number of non-zero DCT coefficients in the patch, and wherein weighted determined parent patches are obtained; in an accumulation unit,
  - accumulate the weighted determined parent patches to obtain an upsampled high-resolution patch; and
  - replace, in an insertion unit, an upsampled patch of an upsampled frame corresponding to the current patch with the upsampled high-resolution patch.

12. The apparatus according to claim 11, wherein, the processing unit in the search unit is further configured to calculate and subtract a mean of each current patch and a mean of each similar patch from each pixel value of the respective patch, and wherein the processing unit in the insertion unit is further configured to add the mean of each current patch to each pixel value of the upsampled patch corresponding to the current patch.

* * * * *